(12) United States Patent
Librizzi et al.

(10) Patent No.: US 7,397,290 B2
(45) Date of Patent: Jul. 8, 2008

(54) METHOD AND RELATIVE CIRCUIT FOR GENERATING A CONTROL VOLTAGE OF A SYNCHRONOUS RECTIFIER

(75) Inventors: Fabrizio Librizzi, Gravina di Catania (IT); Franco Lentini, San Gregorio di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 256 days.

(21) Appl. No.: 11/383,070

(22) Filed: May 12, 2006

(65) Prior Publication Data

US 2006/0256597 A1    Nov. 16, 2006

(30) Foreign Application Priority Data

May 13, 2005    (EP) .................................. 05425318

(51) Int. Cl.
*H03K 3/017* (2006.01)
*H03K 7/08* (2006.01)

(52) U.S. Cl. ..................... 327/176; 327/434; 363/127

(58) Field of Classification Search ......... 327/172–177, 327/330, 427, 434–437; 363/76, 77, 127
See application file for complete search history.

(56) References Cited

U.S. PATENT DOCUMENTS

| 5,736,890 | A | | 4/1998 | Yee et al. ..................... 327/423 |
| 5,940,287 | A | * | 8/1999 | Brkovic ....................... 363/127 |
| 5,946,207 | A | * | 8/1999 | Schoofs ....................... 363/127 |
| 6,781,432 | B2 | * | 8/2004 | Nishikawa ................... 327/330 |
| 6,903,597 | B2 | * | 6/2005 | Tai ............................... 327/434 |
| 2002/0001204 | A1 | | 1/2002 | Lentini et al. ............. 363/21.06 |
| 2005/0094424 | A1 | * | 5/2005 | Rivet ........................... 363/127 |

* cited by examiner

*Primary Examiner*—N. Drew Richards
*Assistant Examiner*—William Hernandez
(74) *Attorney, Agent, or Firm*—Allen, Dyer, Doppelt, Milbrath & Gilchrist; Lisa K. Jorgenson (57) ABSTRACT

A control voltage for a synchronous rectifying transistor is generated with the desired anticipation time. The anticipation time is continuously controlled with a closed-loop technique by comparing it with the duration of a reference pulse. The resulting error signal is processed and provides the necessary correction to the MOSFET gate signal to equalize the actual anticipation time to the duration of the reference pulse.

25 Claims, 6 Drawing Sheets

METHOD AND RELATIVE CIRCUIT FOR GENERATING A CONTROL VOLTAGE OF A SYNCHRONOUS RECTIFIER

FIELD OF THE INVENTION

The present invention relates to rectifiers, and more particularly, to a method and relative circuit for controlling a synchronous rectifying transistor, which is an essential component of a switched mode power supply.

BACKGROUND OF THE INVENTION

Figure 1:
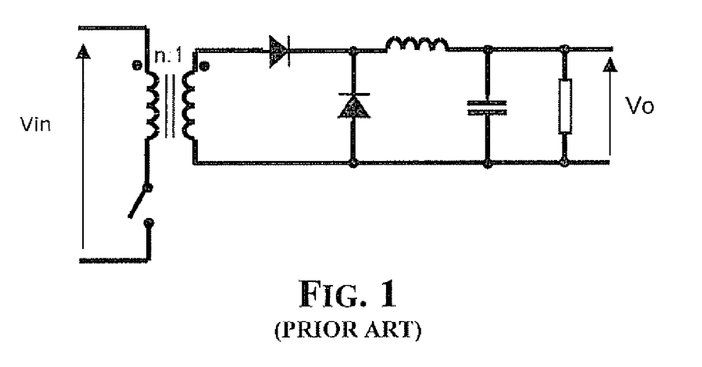
FIGS. 1, 2 and 3 show sample AC-DC and DC-DC converters in accordance with the prior art.
Figure 2:
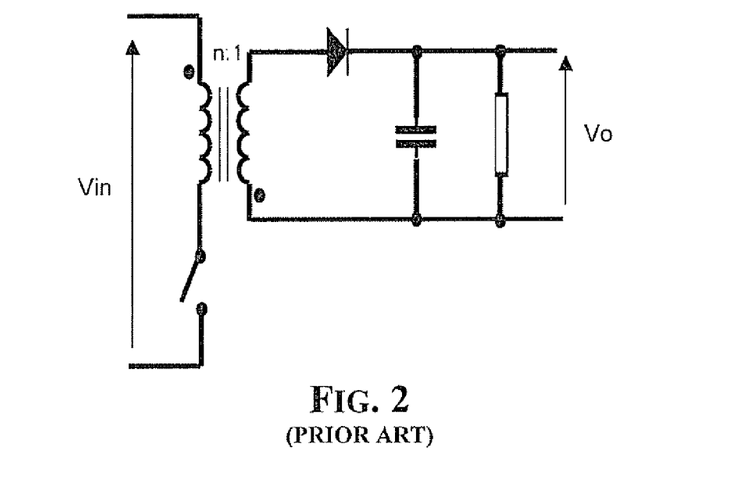
Figure 3:
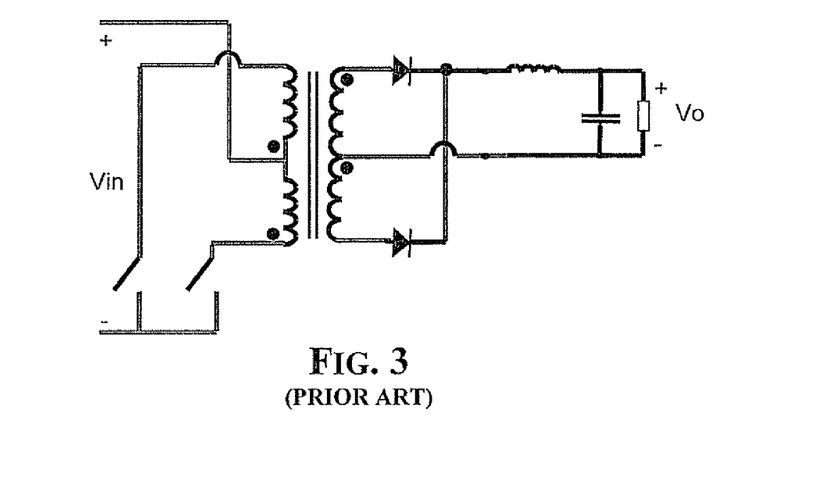

Rectifiers are used in AC-DC, DC-DC voltage converters, as well as in Switching Mode Power Supplies (SMPS). Typically, they are coupled to a secondary winding of a transformer for providing rectified half-waves to a load to be supplied, as shown in FIGS. 1-3.

Often, properly controlled MOSFETs are used as rectifiers instead of diodes because their power loss is smaller than that of diodes. A MOSFET is often referred to as a synchronous rectifier (SR). A synchronous rectifier is turned on and off by a dedicated control circuit for reproducing a diode voltage-current characteristic. The control signal of a synchronous rectifier is generally derived from a PWM control signal that determines the functioning states of the converter.

The way the control signal is derived from the PWM control signal depends upon the topology in use and on the presence of voltage isolation in the topology. In a non-isolated switched mode power supply topology, the synchronous rectifier control circuit can obtain the information about the switching transitions (turn-off and turn-on) of the main switch from the main control circuit in a very simple way. In isolated topologies with a primary side control, the absence of a PWM control signal on the secondary side of the isolation barrier makes the generation of control signals for the synchronous rectifiers more difficult.

If a synchronous rectifier does not function as a diode, the well-known phenomena of cross conduction and shoot-through may occur. In all of these circumstances, one of the switches is forced to a conduction phase in the first quadrant of its voltage-current characteristic. Therefore, switching losses may become predominant, wasting most of the benefits introduced by the reduction of conduction losses by the rectifiers, or may even hinder a correct functioning of the circuit.

Figure 4:
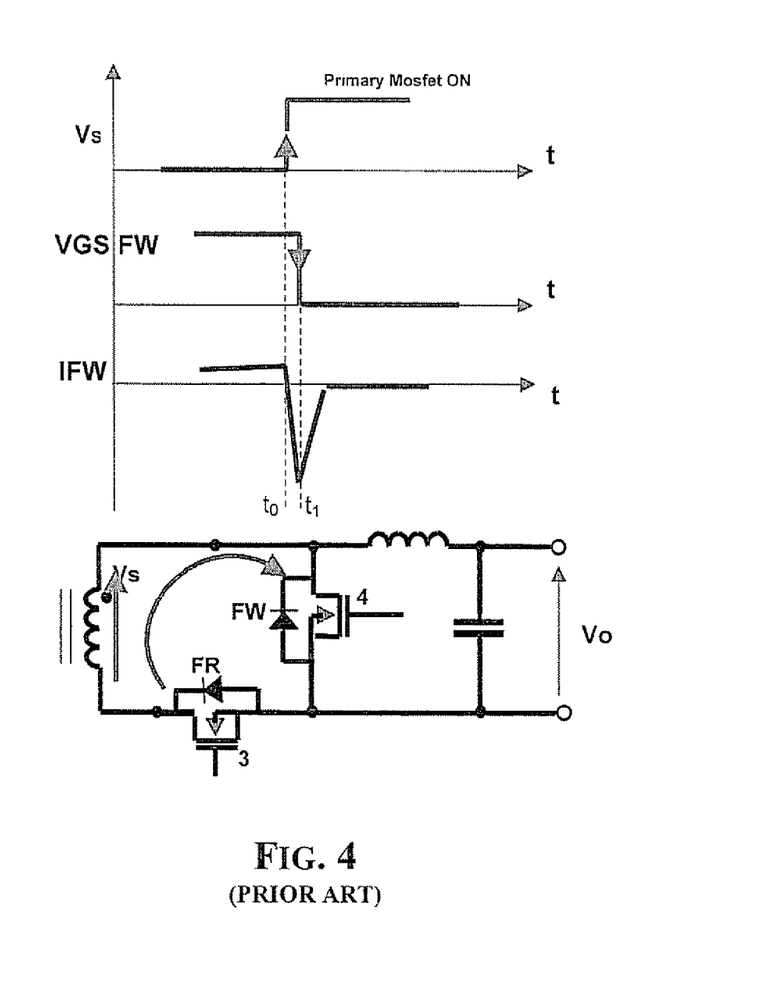
FIGS. 4 and 5 illustrate transient turn-off responses of synchronous rectifiers of a converter in accordance with the prior art.
Figure 5:
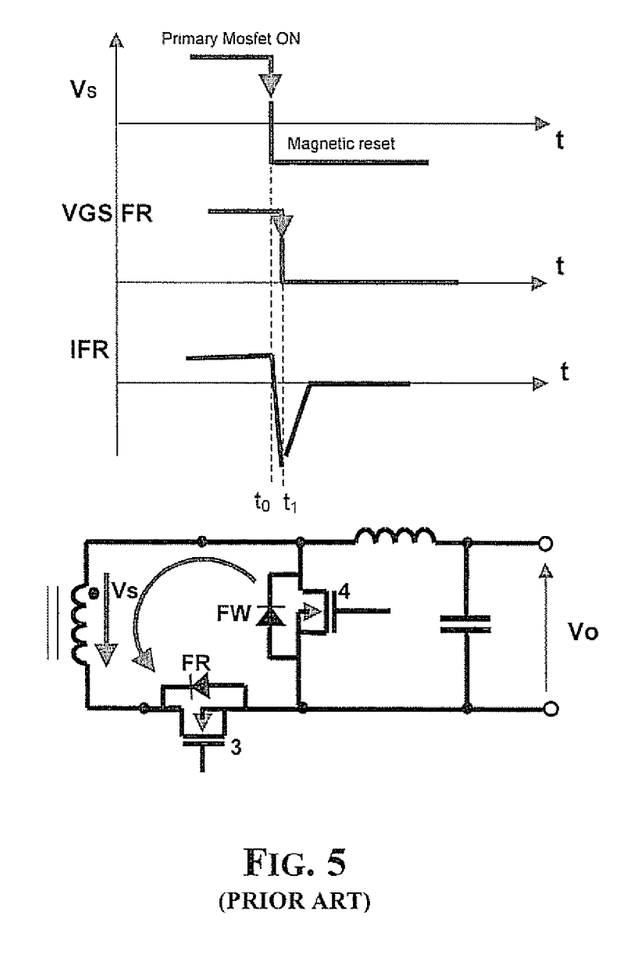

FIGS. 4 and 5 illustrate the turn-off waveforms of the control voltage (gate-source voltage) Vgs and the source current I of the synchronous rectifiers FW and FR after a step variation of the voltage Vs at the secondary winding of a transformer of a sample AC-DC or DC-DC converter, due to the turning on or off of a MOSFET in series to the primary winding of a transformer of a converter.

Figure 6:
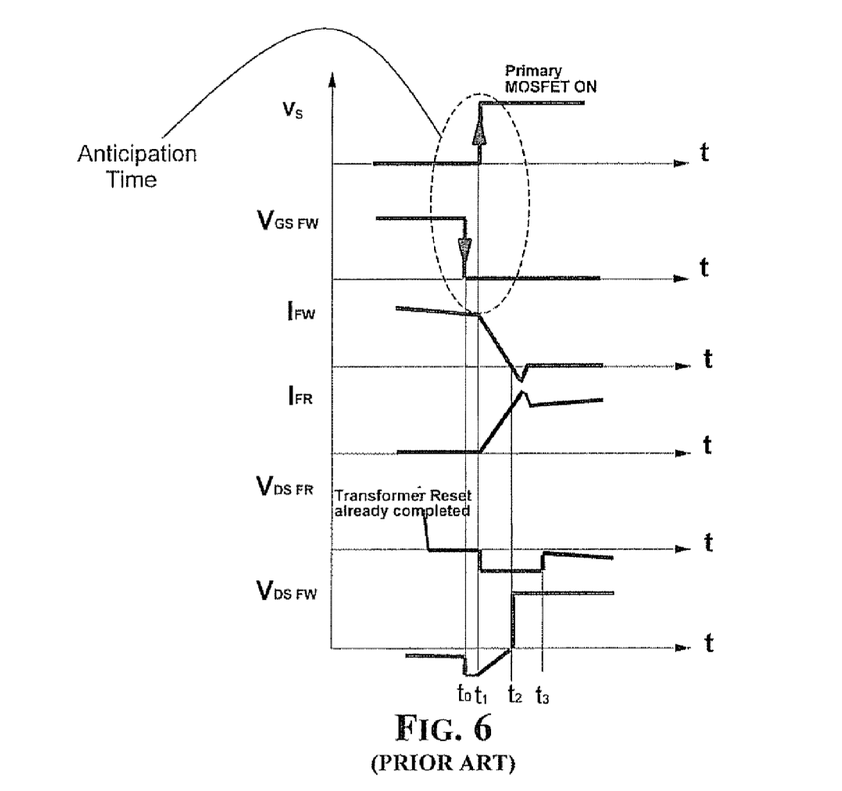

FIG. 6 illustrates time characteristics of the gate-source voltage Vgs, the source current I and the drain-source voltage of the synchronous rectifiers FW and FR when the rectifier FW is turned-off a short time before the voltage Vs in the secondary winding is switched high. The time interval from the trailing edge of the control voltage Vgs and the leading edge of the voltage Vs is herein referred as the "anticipation time". It is desirable that this time not be a null so that the rectifier FW is already off when the rectifier FR is turned on, otherwise the secondary winding could be short-circuited.

Clearly, the control voltage Vgs of the rectifier FW (and evidently also of the rectifier FR) is generated as a function of the PWM signal that controls the switch in the primary side of the converter, or vice-versa.

Figure 7:
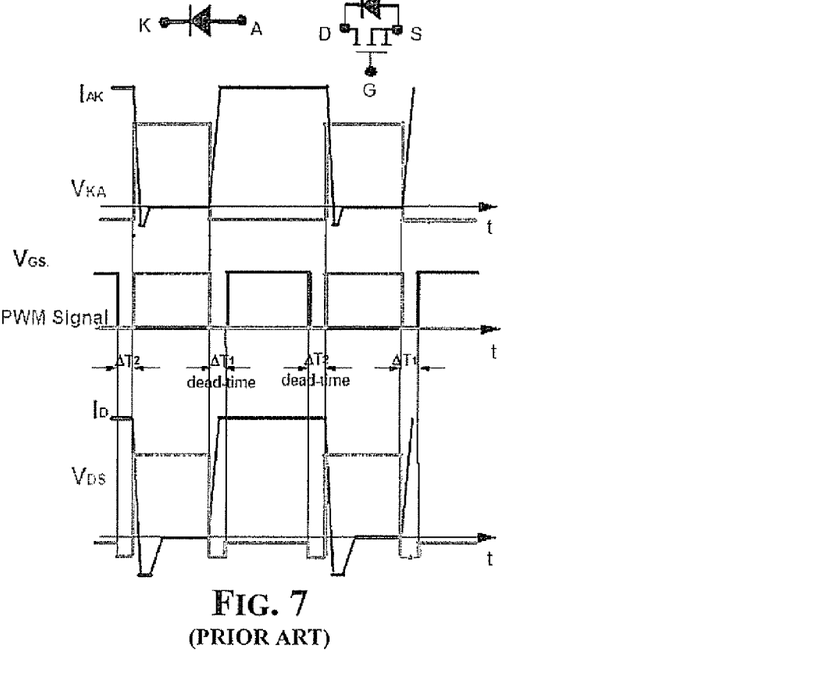
FIG. 7 compares time responses of a diode and of a MOSFET used as a synchronous rectifier in accordance with the prior art.

The required timing of the control signals of a synchronous rectifier is shown in FIG. 7 for a converter formed according to a general switched-mode topology with one switch and only one diode. The conduction phases of the switch and the diode do not overlap each other. The shown dead time intervals prevent contemporary cross-conduction of the switch of the converter and the synchronous rectifier operating as a diode, but they need to be shortened as much as possible to minimize or reduce synchronous rectifier conduction times of the parasitic diode, and the consequent loss of efficiency. In fact, MOSFETs used as rectifying transistors may show poor performance because their parasitic diode (body-diode) is turned on at least during transitions between different states.

The functioning of the body-diode depends on the timing of the control signal, and in particular, on the turn-off instant of the synchronous rectifier with respect to the time interval in which the diode replaced by a MOSFET is supposed to be in a conduction state A to early turn-off of the synchronous rectifier is susceptible to cause an increase of conduction losses due to the body-diode, in which the whole current would flow. The switching losses caused by the reverse recovery current through the body-diode therefore depend on the current flowing through it at the instant in which the cathode-anode voltage $V_{KA}$ reverses.

In isolated topologies, if the control circuit that generates the PWM signal is at the secondary side, the task of controlling synchronous rectifiers may be easily addressed. In fact, the PWM signal available on the secondary side may be used to generate the driving signal for the synchronous rectifiers by adequately delaying edges of the PWM signal for compensating the propagation delays of the control signal transferred to the primary side of the converter through a dedicated coupling device.

Figure 8:
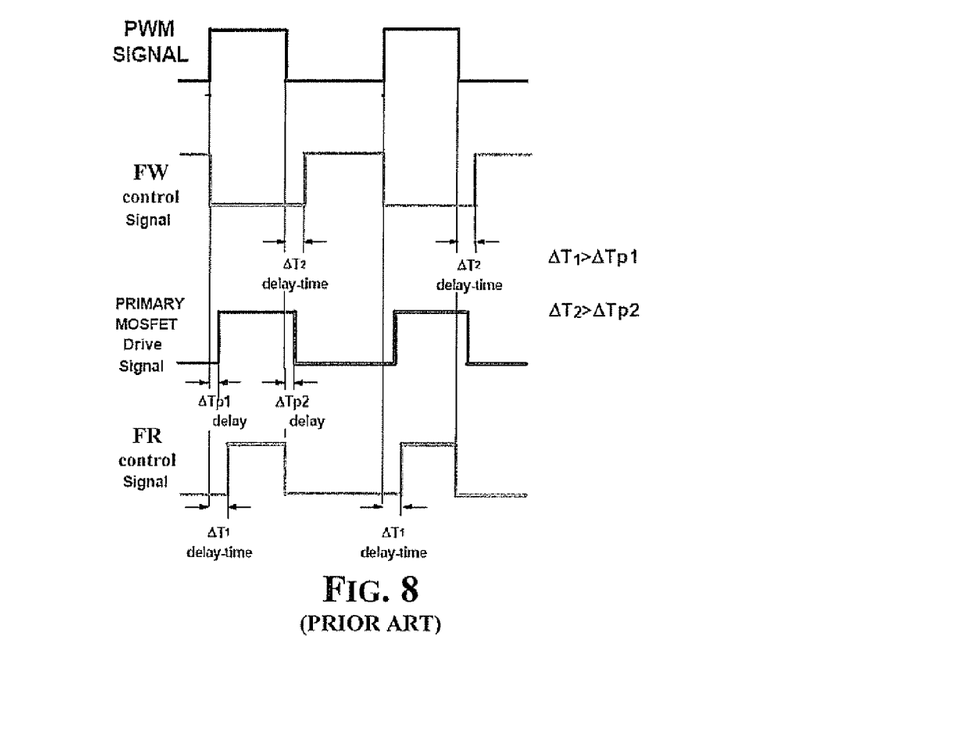
FIG. 8 shows sample waveforms for the synchronous rectified forward converter of FIG. 1.

The required timing for this kind of operation is shown in FIG. 8, in the more general case of two complementary signals on the secondary side. The control signal of a MOSFET in the primary side of the converter is generated with a slight delay $\Delta Tp1$, $\Delta Tp2$ from the PWM signal, while the edges of the control signals of the rectifiers FW and FR of the converter of FIG. 5 are delayed by larger delays $\Delta T1$ and $\Delta T2$, respectively. Even in this case, dead times between drive signals are necessary to prevent an eventual cross conduction between two synchronous rectifiers and between an synchronous rectifier and a switch of the converter.

However, secondary side control configurations show several drawbacks. One drawback is the need of an auxiliary power supply for the start-up of the converter for a crossing-isolation circuit being able to transfer the PWM signal of synchronous rectifying transistors to switches on the primary side of a converter. Another drawback is in transferring the information regarding the current on the primary switch to the PWM controller in current mode control loops. Therefore, the use of a PWM control signal on the primary side of a converter is mandatory to form switched mode power supplies (SMPS) with high performance in terms of high efficiency, small dimensions and low cost.

In isolated topologies, if the control circuit that generates the PWM signal is on the primary side of a converter, then the PWM signal cannot be available on the secondary side in a simple, effective and low cost manner. This information may be derived at the secondary side from the output of the isolation transformer of the converter.

In this case, however, the synchronizing signal at the output of an isolation transformer is the effect of primary main switch commutations. This signal, in fact, is equalized to the PWM signal in a continuous conduction mode (CCM), but it is negatively affected by the parasitic elements of the circuit that distort its waveform.

The delay in the propagation chain of the signal derived by the PWM signal makes it not suitable to control the synchronous rectifier on the secondary side. This is because the delay control makes the switch and the synchronous rectifier of the converter be in a conduction state at the same time.

Methods and relative control circuits capable of generating a control voltage for a synchronous rectifier with the desired anticipation time in order to turn-off the synchronous rectifier before a switch of the converter is turned on have been developed in different ways.

A first technique is described in U.S. Pat. No. 6,418,039. The pulses of a high frequency oscillator (HFO) (more than 100 times the main converter switching frequency) are counted during each switching period of a PWM signal, and the anticipation time is determined by decreasing/increasing the counting obtained during the previous switching period.

The main advantage of this technique is that the system is very fast to face eventual transient conditions, because the counting is updated at each switching period, The main drawback is that the digital counting causes an output jitter, the width of which is twice the period of the HFO. Unfortunately, the minimum anticipation time is determined by the frequency of the HFO, thus the HFO frequency needs to be increased for obtaining low anticipation times. Therefore, this technique is likely to increase power dissipation and requires counters with a relatively large end-scale count.

An analog method to generate the anticipations of the turn-off transition in the driving timing has been disclosed in the U.S. Pat. No. 5,736,890, implemented in a circuit by SRMOS Inc. According to this method, two different analog ramps and one threshold variable with TON or TOFF are used for generating the anticipation time. Three passive components (capacitors) are needed to generate the ramps and the variable threshold. Two of these capacitors need to be accurate to have a precise anticipation time.

Stability in time and in temperature is not good because of the presence of passive components. To obtain very short anticipation time values, the capacitors need to be determined very accurately. In case of capacitor value variations due to unpredictable events (temperature changes, capacitor life, etc.) this anticipation time can be lost causing cross conduction problems.

Another control technique that uses a Phase Lock Loop (PLL) based system for establishing the desired time anticipations of the turn off transitions has been recently implemented by International Rectifier in the integrated circuit IR1175.

This method is quite complex in terms of design relations needed to obtain the desired control. It requires many external components and has a relatively high pin count to set the parameters that are necessary for correctly implementing the control technique. Moreover, a drawback of this method is a slow response time to switching frequency variations. Should a noise cause a variation of the switching frequency, the PLL would react too slowly to this variation.

As a consequence, the anticipation times would be inaccurately determined and this would reduce the overall efficiency of the converter. A faster response time may be achieved at the cost of worsening the accuracy with which the anticipation time is determined, which would negatively affect the efficiency of the converter.

SUMMARY OF THE INVENTION

In view of the foregoing background, an object of the present invention is to provide a method and a relative control circuit for generating a control voltage of a synchronous rectifying transistor.

In accordance with the present invention, a control voltage for a rectifying transistor with the desired anticipation time in generated in a new and effective way. The anticipation time is, in fact, continuously controlled with a closed-loop technique by comparing it with the duration of a reference pulse. The resulting error signal is processed and the MOSFET gate signal is adjusted to equalize the actual anticipation time to the duration of the reference pulse.

More precisely, the invention provides a method for generating a PWM control voltage for a synchronous rectifying transistor comprising the steps of generating a feedback logic signal that assumes an active logic value when a PWM control voltage of the transistor and the drain-source or collector-emitter voltage of the transistor assume a null logic level.

A logic pulse signal of a pre-established duration is generated on active edges of the control voltage The PWM control voltage is generated, and the duration of a logically active level of this voltage is determined by the difference between the time durations of the logic signals for equalizing the durations of the logic signals.

This method may be implemented by a closed-loop control circuit.

BRIEF DESCRIPTION OF THE DRAWINGS

The invention will be described referring to the attached drawings, wherein.

FIG, 6 depicts transient time-responses of voltages and currents flowing in the synchronous rectifiers of FIGS. 4 and 5.

DETAILED DESCRIPTION OF THE PREFERRED EMBODIMENTS

Figure 9:
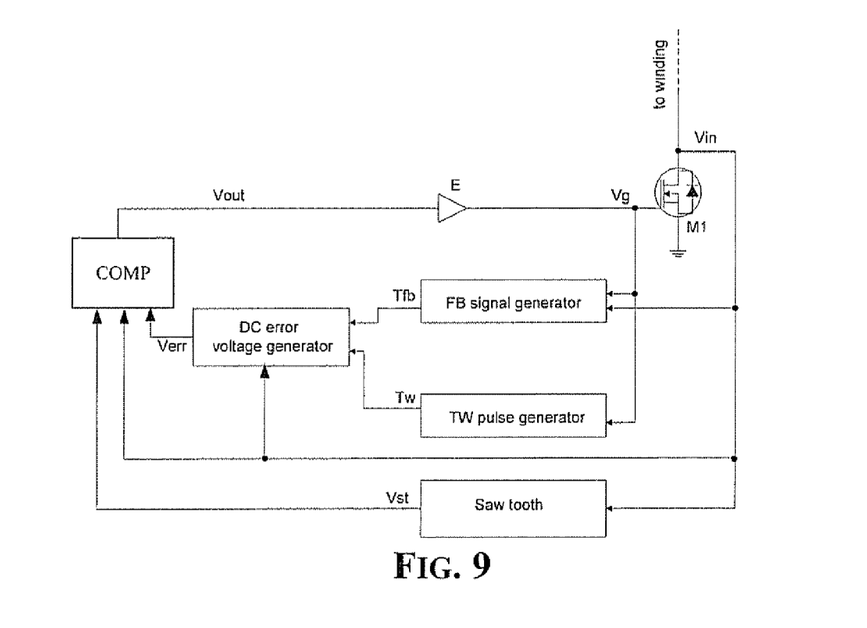
FIG. 9 depicts a first embodiment of a control circuit in accordance with the present invention.
Figure 10:
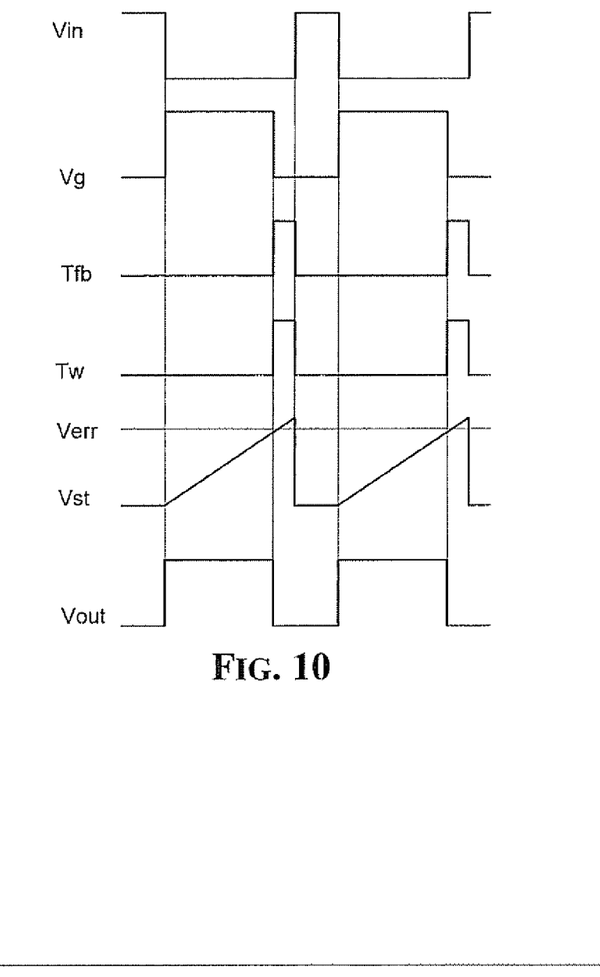
FIG. 10 depicts sample timing diagrams of waveforms of the main signals of the circuit of FIG. 9.

A general block diagram of a control circuit for generating a control voltage of a transistor, to be used as a synchronous rectifier according to the method of the invention is shown in FIG. 9, while FIG. 10 shows sample waveforms of its signals when the logic signals Tfb and Tw are equalized. The N-channel MOSFET M1 is the synchronous rectifier that is to be controlled. When the converter that includes a synchronous rectifier is working in a continuous mode, the Vin signal is a square wave signal.

At each trailing edge of the Vg signal, a pulse Tw is generated by the monostable TW PULSE GENERATOR. The block FB SIGNAL GENERATOR generates the feedback logic signal Tfb as a logic NOR between the signals Vin and Vg. The two signals Tw and Tfb are input to a controlled voltage generator DC ERROR that generates a voltage Verr, the level of which is representative of the width difference between the logic pulses Tfb and Tw.

A logic circuit COMP compares the voltage Verr and a saw tooth waveform Vst synchronized with the voltage Vin that is started, stopped and reset corresponding to edges of the voltage Vint generates an auxiliary PWM control signal Vout that may assume an active logic level only when the saw-tooth voltage Vst is not constant The signal Vout is input to a non-inverting buffer E that controls the MOSFET gate.

The circuit adjusts the PWM control voltage Vg of the MOSFET for equalizing the pulse Tfb with the pulse Tw. Due to its closed-loop architecture, the circuit controls the MOSEET with the desired anticipation time compensates eventual fluctuations of the duration of the pulse Tfb due to variations of the temperature of the MOSFET or other phenomena whose effects cannot be precisely predicted in advance.

Figure 11:
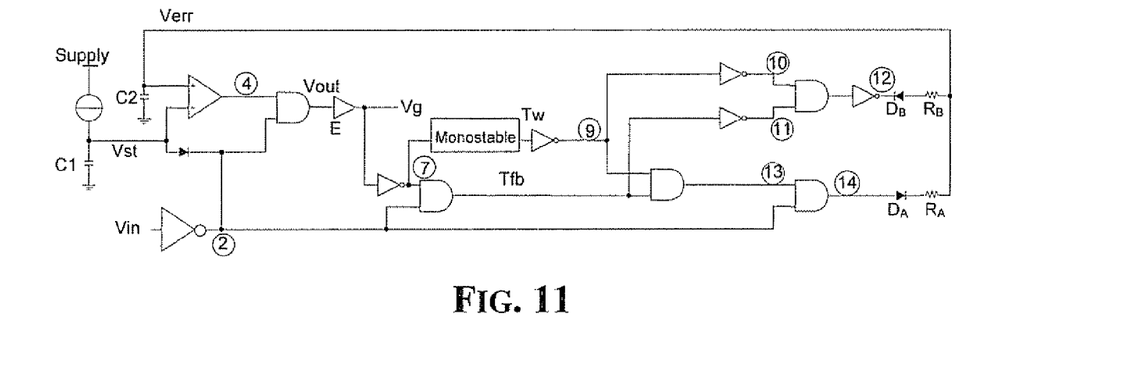
FIG. 11 depicts a detailed scheme of a control circuit in accordance with the present invention.
Figure 12:
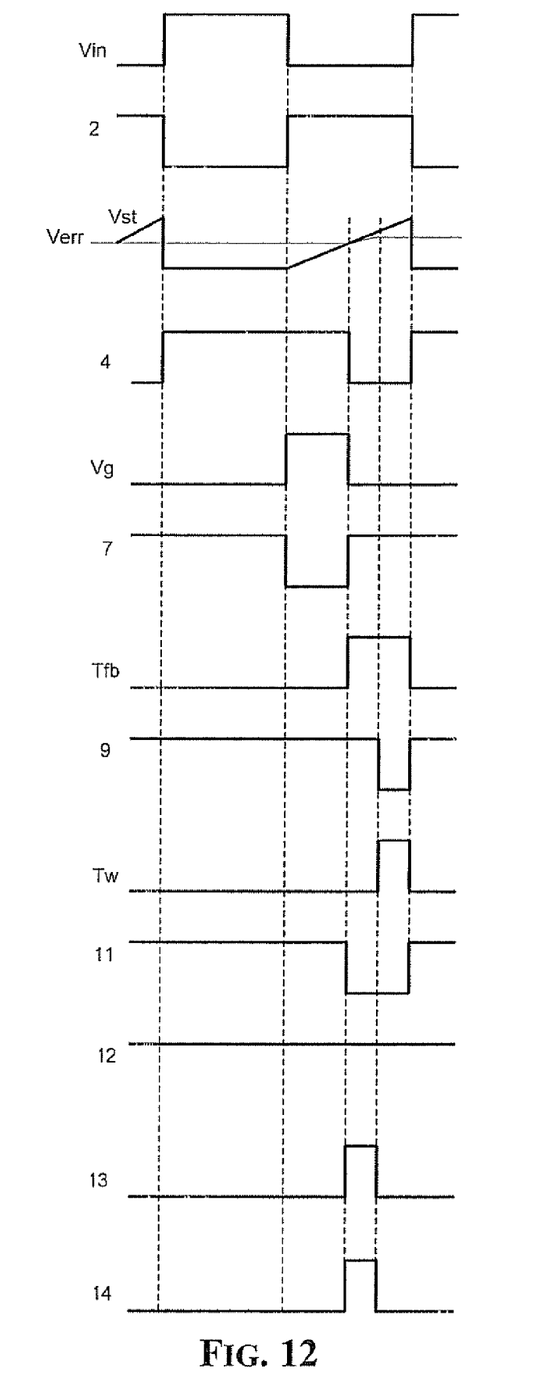
FIG. 12 depicts sample timing diagrams of waveforms of the main signals for the device shown in FIG. 11.

A detailed circuit scheme of an embodiment of the control circuit that implements the described method is shown in FIG. 11, and sample waveforms of its signals are depicted in FIG. 12 in a sample case in which the logic signals Tfb and Tw are not equalized.

The drain-source voltage Vin of the synchronous rectifier (the depicted MOSFET) is inverted and the signal 2 is generated. When the signal 2 is at a high logic level, the constant current source charges the capacitor C1. When the signal 2 switches low, the voltage on the capacitor C1 is reset. Therefore, the signal Vst is a saw tooth waveform started corresponding to the trailing edges of Vin, and stopped and reset corresponding to the leading edges thereof.

To ensure that the voltage Vout is null when the voltage Vin switches high, the depicted comparator compares the voltage Verr on the capacitor C2 with the saw-tooth voltage Vst, and generates a signal 4. This is while the AND gate in cascade thereto is input with the signals 4 and 2, and generates the voltage Vout.

The auxiliary PWM control signal Vout is input to the buffer E, which generates the PWM control signal Vg of the synchronous rectifying MOSFET.

The PWM control voltage Vg is logically inverted (7) and, at each leading edge of the signal 7, the pulse Tw is generated by the circuit MONOSTABLE. The duration of the pulse Tw represents the desired anticipation time.

The feedback logic signal Tfb is the logic AND between the signals 7 and 2. If the width of the signal Tfb is larger than the width of the pulse Tw, this means that the duration of the active phase of the PWM control voltage Vg needs to be increased to equalize Tfb to Tw.

How the error voltage Verr is generated is evident from FIG. 11, which is self-explanatory for any skilled person. When the signal 14 is high, it charges the capacitor C2 through resistor $R_A$ and diode $D_A$. Charging C2 will result in an increased voltage Verr. As a consequence, the duration of the active phase of the PWM control voltage Vg is increased The increase of the error voltage Verr depends on the resistance PA and the capacitance C2 that both determine the gain of the control device.

Similarly, if the width of the feedback signal is smaller then the width of the pulse Tw, a signal 12 that discharges the capacitor C2 through the diode $D_B$ and the resistor $R_B$ is generated. The error voltage Verr thus decreases and so does the active phase of the PWM control voltage Vg.

As it is well know from the of theory feedback controlled systems, the steady state value of the difference between the durations of Tfb and Tw is inversely proportional to the total DC gain of the closed-loop. By choosing appropriately the resistors $R_A$ and $R_B$ and the capacitor C2, it is possible to have a relatively large DC gain, and thus it is possible to make very small the difference between the logic signals Tfb and Tw.

The signal 14 in FIG. 12 is not null because the signals Tfb and Tw are not equalized, and thus corresponds with the active level of the signal 14. The error voltage Verr increases according to a charge transient of the R-C circuit composed of the resistor $R_A$ and the capacitor C2.

According to a preferred embodiment of the invention, the capacitors C1 and C2 and the resistor $R_A$ are dimensioned for making the saw tooth voltage Vst increase faster than the error voltage Verr, otherwise the signal 4 (and thus almost all signals of the control circuit of FIG. 11) would be corrupted by spurious switching.

According to an alternative embodiment of the circuit of FIG. 11, it is even possible to employ two distinct monostable generators respectively to generate, instead of a single pulse Tw, a pair of pulses $Tw_A$ and $Tw_B$ of different durations, for turning immediately off the MOSFET when the feedback pulse signal Tfb becomes shorter than both pulses $Tw_A$ and $Tw_B$. The pulse $Tw_A$ is equivalent to the pulse Tw and will be used to ultimately generate the signal 14, while the other pulse $Tw_B$, of shorter duration than the pulse $Tw_A$, will be compared with the pulse Tfb. If the duration of the latter (Tfb) is shorter than the duration of the former ($Tw_B$), a low-impedance path of the control circuit is enabled for discharging as quickly as possible the capacitor C2. As a consequence, the PWM control voltage Vg switches low and the MOSFET is immediately turned off.

A low-impedance path suitable to this end may be simply composed of a switch for grounding the capacitor C2, enabled by a control signal generated by a dedicated logic signal as a logic AND between the pulse signal $Tw_B$ and an inverted replica of the feedback pulse signal Tfb.

Preferably, the resistance $R_B$ is smaller than $R_A$ for discharging the capacitor C2 more quickly than how it is charged. In so doing, the off-time of the synchronous rectifier is increased, and this prevents a possible cross-conduction phenomena A significant difference between the control circuit of the invention and the circuits of the above-mentioned prior art documents is that the duration of the active phase of the PWM control signal in accordance with the invention is adjusted in a closed-loop manner. Therefore, the desired anticipation time is maintained substantially in any condition. Moreover, the desired anticipation time can be changed as desired by changing the duration of the pulse Tw.

The method of the invention is substantially analog, and for this reason, the PWM control voltage Vg is not disturbed by high jitter, as in the method disclosed in U.S. Pat. No. 6,418, 039. Moreover, the method of the invention is implemented in a control circuit that does not include a PLL, as the above-mentioned integrated circuit IR1175.

The advantages of the control circuit of the invention are stability, safety, better efficiency, cost and transient response In terms of stability, for example, if the gate capacitance of the MOSEET increases because of temperature or because of its natural fluctuations during the life time of the MOSFET, the discharging time increases and the anticipation time decreases. Even in this case, the method of the invention is effective in keeping constant the anticipation time.

In terms of safety, by keeping the anticipation time at the pre-established value, the disclosed method prevents the synchronous rectifiers from being incorrectly controlled and from causing a cross-conduction phenomena in the converters, In terms of efficiency, better efficiency is provided since the anticipation time is kept always at the same value even with time and temperature changes. The anticipation time may be shorter than in known control circuits of synchronous rectifiers, even down to 10 ns. As a consequence, the time in which the body-diode is in a conduction state is reduced accordingly, thus reducing conduction losses and reverse recovery losses.

In terms of cost, the control circuit of the invention is straightforward and uses standard low-cost components, while known analogous control circuits exploit complicated PLL techniques or digital counting.

In terms of a transient response, the worst condition in controlling synchronous rectifiers is when a sudden duty-cycle decrease happens. In known control circuits this situation is likely to vary dangerously the anticipation time. In contrast, if the gain of the control circuit of the invention in discharging the capacitor is much larger than its gain during charging phases, even when the duty-cycle quickly decreases, then the capacitor is quickly discharged.

Therefore, the anticipation time is immediately increased and the synchronous rectifier is turned off for a longer time, thus preventing effectively any possible malfunctioning The control circuit reacts with only one switching period of delay to fast varying transients This cannot be accomplished using the cited prior methods.

REFERENCES

1) F. Librizzi, P. Scalia—"STSRX FAMILY: MIXED-SIGNAL ICS TO DRIVE SYNCHRONOUS RECTIFIERS IN ISOLATED SMPS"—STMicroelectronics Application Note—July 2000.
2) I. D. Jitaru—"High Efficiency DC/DC Converter"—HFPC Proceedings, April 1994
3) M. M. Jovanovic, M. T. Zhang, F, C. Lee—"Evaluation of Synchronous-Rectification Efficiency Improvement Limits in Forward Converter"—IEEE Transaction on Industrial Electronics, Vol. 42, No. 4, August 1995.
4) H. P. Yee, S. Sawahata—"A Balanced Review of Synchronous Rectifiers in DC/DC Converters"—PESC 1999.
5) M. Madigan, M. Dennis—"50W Forward Converter with Synchronous Rectification and Secondary Side Control"—Unitrode Power Supply Design Seminar 1999-00 Series.
6) Yee et ale—U.S. Pat. No. 5,736,890—Method and Apparatus for Controlling Transistors as Rectifiers—Apr. 7, 1998.
7) SR-CIC—SRMOC Preliminary Application Note.
8) IR1175—International Rectifier Datasheet.

That which is claimed:

1. A method for generating a PWM control voltage for a synchronous rectifying transistor, the method comprising:
   generating a feedback logic signal having an active logic level when the PWM control voltage of the transistor and a voltage across conduction terminals of the transistor are at a null logic level;
   generating a first pulse logic signal having a first time duration corresponding to active edges of the PWM control voltage; and
   generating the PWM control voltage, a time duration of the active logic level of the PWM control voltage being determined based upon a difference between the time durations of the feedback and first pulse logic signals, for equalizing time durations of the feedback and first pulse logic signals.

2. The method according to claim 1, wherein the transistor comprises a MOSFET including drain and source terminals, and wherein the conduction terminals correspond to the drain and source terminals.

3. The method according to claim 1, wherein the active edges of the PWM control voltage correspond to trailing edges of the PWM control voltage.

4. The method according to claim 1, further comprising:
   generating a second pulse logic signal having a second time duration shorter than the first time duration corresponding to the active edges of the PWM control voltage; and
   switching low the PWM control voltage when the time duration of the feedback logic signal is shorter than the time duration of the second pulse logic signal.

5. A control circuit for a synchronous rectifying transistor comprising:
   a feedback signal generator for generating a feedback logic signal having an active logic level when a PWM control voltage of the transistor and a voltage across conduction terminals of the transistor are at a null logic level;
   a first pulse generator for generating a first pulse logic signal having a first duration corresponding to active edges of the PWM control voltage; and
   a voltage circuit receiving as input the feedback logic signal and the first pulse logic signal for generating the PWM control voltage, a duration of the active logic level of the PWM control voltage being determined based upon a difference between the time durations of the feedback and first pulse logic signals, for equalizing the time durations of the feedback and pulse logic signals.

6. The control circuit according to claim 5, wherein said first pulse generator comprises a monostable generator.

7. The control circuit according to claim 5, wherein said transistor comprises an N-channel MOSFET including drain and source terminals, with the conduction terminals corresponding to the drain and source terminals; and
   wherein the active edges of the PWM control voltage correspond to trailing edges of the PWM control voltage.

8. The control circuit according to claim 5, wherein said voltage circuit comprises:
   an error voltage generator for generating an error voltage representing a difference between the time durations of the feedback and first pulse logic signals;
   a saw tooth voltage generator for generating a saw tooth voltage synchronized with edges of the voltage across the conduction terminals of the transistor;
   a comparator circuit for comparing the saw tooth voltage with the error voltage and generating, based upon the comparison, an auxiliary PWM control signal having an active logic level when the saw tooth voltage is smaller than the error voltage and the voltage across the conduction terminals of the transistor are at the null logic level; and
   a logic buffer for generating the PWM control voltage as an amplified replica of the auxiliary PWM control signal.

9. The control circuit according to claim 5, wherein said feedback signal generator comprises a logic circuit for generating the feedback logic signal as a logic NOR of the PWM control voltage and the voltage across the conduction terminals of the transistor.

10. The control circuit according to claim 8, wherein said comparator circuit comprises:
- a comparator having a first input receiving the error voltage and a second input receiving the saw tooth voltage, and an output providing an intermediate logic signal;
- a hold capacitor for the error voltage and coupled between the first input of said comparator and a ground potential; and
- a logic AND gate having a first input receiving an inverted replica of the voltage across the conduction terminals of the transistor and the intermediate logic signal, and an output providing the auxiliary PWM control signal.

11. The control circuit according to claim 10, wherein said error voltage generator comprises:
- a logic circuit generating
  - a first intermediate logic signal based upon a logic AND between the feedback logic signal and inverted replicas of the first pulse logic signal and the voltage across the conduction terminals of the transistor, and
  - a second intermediate logic signal based upon a logic NAND between the first pulse logic signal and an inverted replica of the feedback logic signal; and
- first and second resistors having first terminals short-circuited to the first input of said comparator, and second terminals respectively coupled to receive the first and second intermediate logic signals, or left floating, respectively depending on whether the first intermediate logic signal is active and the second intermediate logic signal is null.

12. The control circuit according to claim 11, wherein a slope of the saw tooth voltage is larger than a reciprocal of a product between a resistance of said first resistor and a capacitance of said hold capacitor.

13. The control circuit according to claim 10, further comprising:
- a second pulse generator for generating a second pulse logic signal having a shorter time duration than the first pulse logic signal;
- a switch for enabling a low impedance discharge path of said hold capacitor; and
- a second logic circuit for generating an enable signal for said switch based upon a logic AND between the second pulse logic signal and an inverted replica of the feedback logic signal.

14. The control circuit according to claim 13, wherein said second pulse generator comprises a second monostable generator.

15. The control circuit according to claim 11, wherein a resistance of said second resistor is smaller than a resistance of said first resistor.

16. A voltage converter comprising:
- a transistor; and
- a control circuit for said transistor comprising
  - a feedback signal generator for generating a feedback logic signal having an active logic level when a PWM control voltage of the transistor and a voltage across conduction terminals of the transistor are at a null logic level,
  - a first pulse generator for generating a first pulse logic signal having a first duration corresponding to active edges of the PWM control voltage, and
  - a voltage circuit receiving as input the feedback logic signal and the first pulse logic signal for generating the PWM control voltage, a duration of the active logic level of the PWM control voltage being determined based upon a difference between the time durations of the feedback and first pulse logic signals, for equalizing the time durations of the feedback and pulse logic signals.

17. The voltage converter according to claim 16, wherein said first pulse generator comprises a monostable generator.

18. The voltage converter according to claim 16, wherein said transistor comprises an N-channel MOSFET including drain and source terminals, with the conduction terminals corresponding to the drain and source terminals; and wherein the active edges of the PWM control voltage correspond to trailing edges of the PWM control voltage.

19. The voltage converter according to claim 16, wherein said voltage circuit comprises:
- an error voltage generator for generating an error voltage representing a difference between the time durations of the feedback and first pulse logic signals;
- a saw tooth voltage generator for generating a saw tooth voltage synchronized with edges of the voltage across the conduction terminals of the transistor;
- a comparator circuit for comparing the saw tooth voltage with the error voltage and generating, based upon the comparison, an auxiliary PWM control signal having an active logic level when the saw tooth voltage is smaller than the error voltage and the voltage across the conduction terminals of the transistor are at the null logic level; and
- a logic buffer for generating the PWM control voltage as an amplified replica of the auxiliary PWM control signal.

20. The voltage converter according to claim 16, wherein said feedback signal generator comprises a logic circuit for generating the feedback logic signal as a logic NOR of the PWM control voltage and the voltage across the conduction terminals of the transistor.

21. The voltage converter according to claim 19, wherein said comparator circuit comprises:
- a comparator having a first input receiving the error voltage and a second input receiving the saw tooth voltages and an output providing an intermediate logic signal;
- a hold capacitor for the error voltage and coupled between the first input of said comparator and a ground potential; and
- a logic AND gate having a first input receiving an inverted replica of the voltage across the conduction terminals of the transistor and the intermediate logic signal, and an output providing the auxiliary PWM control signal.

22. The voltage converter according to claim 21, wherein said error voltage generator comprises:
- a logic circuit generating
  - a first intermediate logic signal based upon a logic AND between the feedback logic signal and inverted replicas of the first pulse logic signal and the voltage across the conduction terminals of the transistor, and
  - a second intermediate logic signal based upon a logic NAND between the first pulse logic signal and an inverted replica of the feedback logic signal; and
- first and second resistors having first terminals short-circuited to the first input of said comparator, and second terminals respectively coupled to receive the first and second intermediate logic signals, or left floating, respectively depending on whether the first intermediate logic signal is active and the second intermediate logic signal is null.

23. The voltage converter according to claim 22, wherein a slope of the saw tooth voltage is larger than a reciprocal of a product between a resistance of said first resistor and a capacitance of said hold capacitor.

24. The voltage converter according to claim 21, wherein said voltage circuit further comprises:

- a second pulse generator for generating a second pulse logic signal having a shorter time duration than the first pulse logic signal;
- a switch for enabling a low impedance discharge path of said hold capacitor; and
- a second logic circuit for generating an enable signal for said switch based upon a logic AND between the second pulse logic signal and an inverted replica of the feedback logic signal.

25. The voltage converter according to claim 22, wherein a resistance of said second resistor is smaller than a resistance of said first resistor.

* * * * *

UNITED STATES PATENT AND TRADEMARK OFFICE
CERTIFICATE OF CORRECTION

PATENT NO. : 7,397,290 B2
APPLICATION NO. : 11/383070
DATED : July 8, 2008
INVENTOR(S) : Librizzi et al.

It is certified that error appears in the above-identified patent and that said Letters Patent is hereby corrected as shown below:

| | |
|---|---|
| Column 1, Line 57 | Delete: "turned-off"<br>Insert: -- turned off -- |
| Column 2, Line 44 | Delete: "an"<br>Insert: -- a -- |
| Column 3, Line 11 | Delete: "turn-off"<br>Insert: -- turn off -- |
| Column 3, Line 23 | Delete: "period,"<br>Insert: -- period. -- |
| Column 3, Line 51 | Delete: "turn off"<br>Insert: -- turn-off -- |
| Column 4, Line 8 | Delete: "in"<br>Insert: -- is -- |
| Column 4, Line 39 | Delete: "FIG,"<br>Insert: -- FIG. -- |
| Column 5, Line 12 | Delete: "Vint"<br>Insert: -- Vin, -- |
| Column 5, Line 14 | Delete: "constant The"<br>Insert: -- constant. The -- |
| Column 5, Line 19 | Delete: "MOSEET"<br>Insert: -- MOSFET -- |
| Column 5, Line 63 | Delete: "PA"<br>Insert: -- $R_A$ -- |
| Column 6, Line 3 | Delete: "know from the of theory"<br>Insert -- known from the theory of -- |

UNITED STATES PATENT AND TRADEMARK OFFICE
CERTIFICATE OF CORRECTION

PATENT NO. : 7,397,290 B2
APPLICATION NO. : 11/383070
DATED : July 8, 2008
INVENTOR(S) : Librizzi et al.

It is certified that error appears in the above-identified patent and that said Letters Patent is hereby corrected as shown below:

Column 6, Line 45      Delete: "phenomena"
                       Insert: -- phenomena. --

Column 6, Line 61      Delete: "response"
                       Insert: -- response. --

Column 6, Line 63      Delete: "MOSEET"
                       Insert: -- MOSFET --

Column 7, Line 28      Delete: "malfunctioning The"
                       Insert: -- malfunctioning. The --

Column 7, Line 30      Delete: "transients This"
                       Insert: -- transients. This --

Column 7, Line 41      Delete: "F, C. Lee"
                       Insert: -- F.C. Lee --

Column 7, Line 52      Delete: "Yee et ale"
                       Insert: -- Yee et al. --

Signed and Sealed this

Sixteenth Day of September, 2008

JON W. DUDAS
*Director of the United States Patent and Trademark Office*